United States Patent
Chen

(10) Patent No.: US 10,091,327 B2
(45) Date of Patent: Oct. 2, 2018

(54) PROCESSING AVAILABLE USER DATA TO DETERMINE A USER PROFILE FOR USE IN ANTICIPATING CHANGING USER INTERESTS

(71) Applicant: PAYPAL, INC., San Jose, CA (US)

(72) Inventor: Hsiao Chen, Brooklyn, NY (US)

(73) Assignee: PAYPAL, INC., San Jose, CA (US)

( * ) Notice: Subject to any disclaimer, the term of this patent is extended or adjusted under 35 U.S.C. 154(b) by 268 days.

(21) Appl. No.: 14/822,851

(22) Filed: Aug. 10, 2015

(65) Prior Publication Data

US 2017/0048348 A1    Feb. 16, 2017

(51) Int. Cl.
*H04L 29/08* (2006.01)
*G06Q 50/00* (2012.01)

(52) U.S. Cl.
CPC ........... *H04L 67/306* (2013.01); *G06Q 50/01* (2013.01); *H04L 67/22* (2013.01)

(58) Field of Classification Search
CPC ........ H04L 67/22; H04L 67/306; G06Q 50/01
See application file for complete search history.

(56) References Cited

U.S. PATENT DOCUMENTS

| | | | |
|---|---|---|---|
| 9,646,322 B2 * | 5/2017 | Minnis | G06Q 30/0244 |
| 2008/0201206 A1 * | 8/2008 | Pokorney | G06F 17/30867 |
| | | | 705/7.29 |
| 2013/0232435 A1 * | 9/2013 | Knapp | G06F 3/0484 |
| | | | 715/771 |
| 2013/0290087 A1 * | 10/2013 | Merwarth | G06Q 30/02 |
| | | | 705/14.27 |
| 2014/0032259 A1 * | 1/2014 | LaFever | G06Q 30/0201 |
| | | | 705/7.29 |
| 2015/0120445 A1 * | 4/2015 | Romero | G06Q 30/0256 |
| | | | 705/14.54 |
| 2016/0086250 A1 * | 3/2016 | Gunjan | G06Q 30/0631 |
| | | | 705/26.7 |
| 2016/0132918 A1 * | 5/2016 | Thomas | G06Q 30/0226 |
| | | | 705/14.27 |
| 2017/0132688 A1 * | 5/2017 | Freund | G06Q 30/0631 |

* cited by examiner

*Primary Examiner* — Michael C Lai
(74) *Attorney, Agent, or Firm* — Haynes and Boone, LLP

(57) ABSTRACT

There are provided systems and methods for processing available user data to determine a user profile for use in anticipating changing user interest. User data for a user may be collected, which may be used to determine a dynamic user profile for the user. The dynamic user profile may be responsive to changes in the user data, as the user performs more actions or indicates interests in certain areas. The dynamic user profile may include user interests and trends of the user, and may be used to perform predictive analysis of the user's potential interests. Additionally, using a plurality of users' interest areas and links based on common users between the interest areas, upcoming interests for the user may be determined through links between interest areas. Thus, if similar users based on interest areas are linked to a certain interest, the user may also be linked to that interest.

20 Claims, 5 Drawing Sheets

PROCESSING AVAILABLE USER DATA TO DETERMINE A USER PROFILE FOR USE IN ANTICIPATING CHANGING USER INTERESTS

TECHNICAL FIELD

The present application generally relates to dynamic online user profiles for use in predictive analysis of changing online user interests and more specifically to processing available user data to determine a user profile for use in anticipating changing user interests.

BACKGROUND

A service provider or merchant may collect information about a user for use in creating a profile for the user. The service provider or merchant may utilize the profile for the user to provide services to the user, such as through a loyalty account. Additionally, the user may indicate interests of the user, which may be stored with the profile and used by the service provider or merchant to communicate offers associated with the interests. Such offers may advertise items associated with the user's past interests to the user. Over time, a user's interests may change, or the user may have certain interests associated with a specific time period. For example, the user may have an upcoming life event, such as a vacation or a graduation. At other times, the user's interests may evolve over time as the user has new hobbies, life changes, work, etc. Thus, the user may be interested in certain items associated with the changing interests of the user. However, without analysis of trending user behavior, the service provider or merchant may provide outdated or unwanted offers to the user. Additionally, the service provider or merchant may be unaware of interests the user may have in areas normally unrelated but often linked based on similar user behavior.

Figure 1:
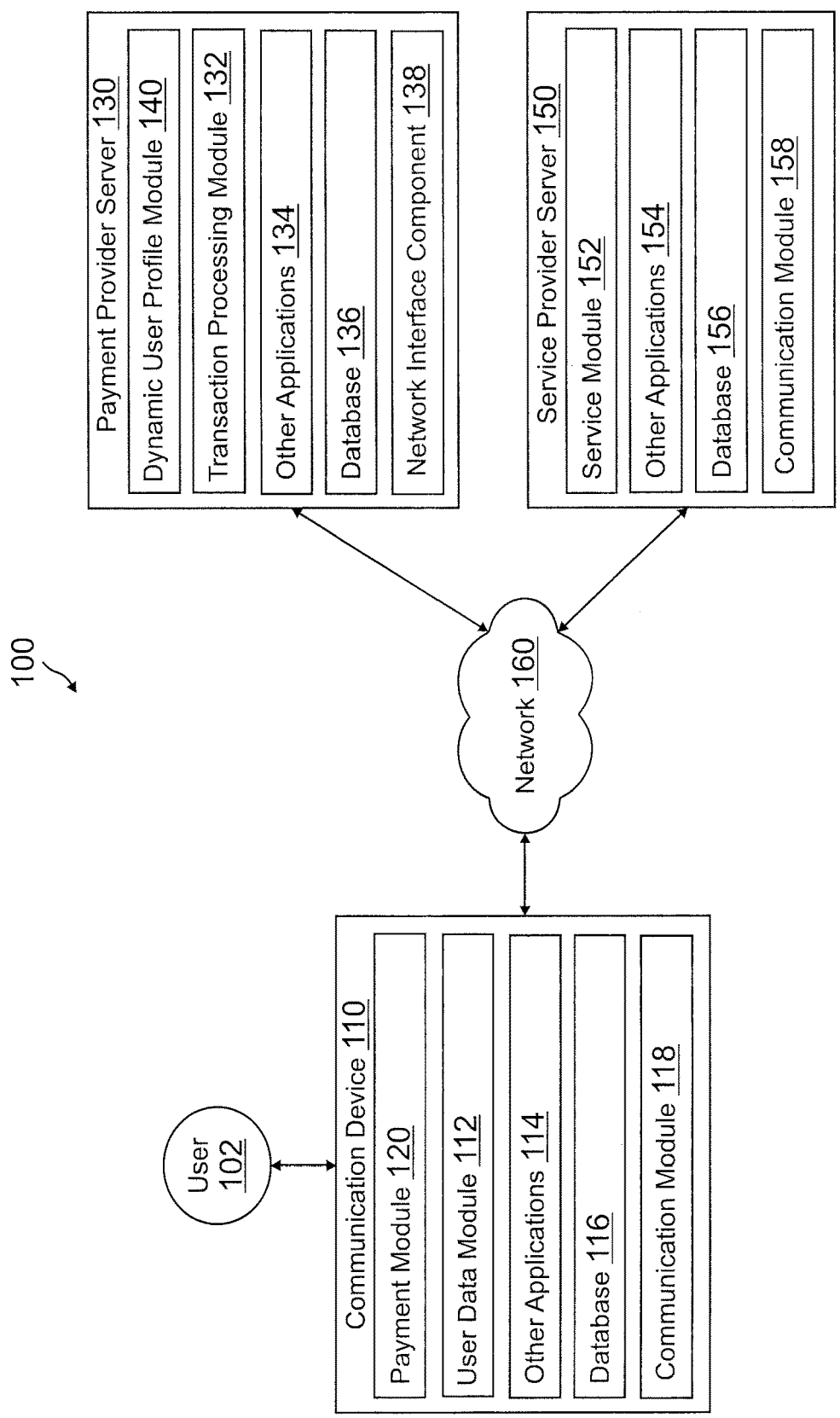
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for processing available user data to determine a user profile for use in anticipating changing user interests. Systems suitable for practicing methods of the present disclosure are also provided.

A user may generate user data, such as user actions of the user, which may be collected and stored by one or more devices of servers. For example, a service provider may collect data associated with the user's online transactions, social networking interactions, messages, connections, loyalty program information, and/or other available online actions by the user. Additionally, the user's communication device may receive data corresponding to the user, which may include the user's personal/financial information, location (which may be determined in conjunction with a GPS or other location determining system), biometrics, communications, and/or other available device actions by the user. The user data may correspond to one or more types of user actions, such as a "purchases," "interactions," "life actions/events," "searches," or other category type associated with the actions in the user data.

A payment provider, or other service provider that offers dynamic user profile services, may receive or obtain the user data from the service provider, public databases and sites, and/or communication device. Additionally, the payment provider may generate user data based on user actions with the payment provider (e.g., transaction processing and payments/transfers, for example, using a payment account offered by the payment provider). The user may actively opt in to providing the user data to the payment provider. For example, the user may establish a loyalty account with the payment provider in order to receive offers for upcoming interests of the user and potential purchases desired by the user. Thus, the payment provider may provide a loyalty program to the user. In other embodiments, the user may be automatically entered to the loyalty program or establishment of the dynamic user profile (e.g., when establishing a payment account with the payment provider), so that the user may be provided with the opportunity to opt out of the loyalty program/dynamic user profile. Thus, the payment provider may request and/or retrieve the user data once the user's preference for the loyalty program/dynamic user profile is established.

Using the user data, a dynamic user profile for the user may be determined by the payment provider. The dynamic user profile may include current user interests of the user and/or current trends of the user. The current user interests and the current trends of the user may be determined using the user data. For example, current user interests may correspond to a specific interest and/or a category of interest based on user actions and/or types of actions in the user data. Thus, a specific current user interest may be a specific item (e.g., an APPLE® mobile phone), a specific service, or other type of single or limited grouped species. In contrast, the current user interest in a category may correspond to a larger genus, such as "electronics," "food," "exercise," and/or a subcategory of a larger genus (e.g., "mobile phones" within "electronics"). In order to determine the current user interests, user actions and types of actions may indicate the current user interests, such as a purchase in the specific interest or interest category, an interaction with a user indicative of the interests (e.g., a communication including the interest or with a merchant selling the interest), an online search, an online social networking interaction with a user or entity associated with the interest, etc. In other embodiments, the user actions and types of actions may include biometrics indicative of an interest (e.g., increased heart rate, pace, etc.), locations indicative of an interest (e.g., a new work, travel location, home location, merchant location, etc.), and/or a combination of user actions and/or types of actions (e.g., biometrics indicative of exercise in an outdoor hiking location, thereby indicating an interest in hiking and/or hiking within that location, purchases at a merchant location indicating interests in that type of sales and/or purchases at that general location, etc.). The user interests may also correspond to upcoming events that may be determined from user actions, such as a graduation of a family member linked to the user based on social networking data Similarly, current user trends may correspond to data processed from the user data and included in the dynamic user profile. The current user trends may correspond to trending information about the user, such as increases and/or decreases in user actions and/or types of actions. For example, the user may increase or decrease spending in a particular interest or interest category, which may indicate an increasing and/or decreasing, respectively, interest level in the interest/category of interest. In other embodiments, current user trends may include changes in messaging, social network interactions, biometrics, locations, etc. The current user trends may be affected by frequency of the aforementioned actions and/or types of actions, as well as the length and/or strength of the aforementioned actions/types of actions. For example, a user may more frequently visit a location or may stay at the location for a long period of time when visiting the location. Thus, the current user trends may correspond to trending data related to the user's interests and/or categories of interests. The user trends may also be used to determine an upcoming life event of the user. For example, if the user often visits a college and is linked to an attendee of the college through a contact list connection, it may be determined that the user may attend an event (e.g., a graduation) for the upcoming life event.

Using the user data, the current user interests, and the current trends of the user, the payment provider may further determine an interest strength/level in each of the user's interests and/or categories of interests. The interest level may correspond to a ranking, score, or other quantifier that is used to indicate an overall strength of interest in the specific interest or interest category. In this regard, an interest level may correspond to an indicator of importance of the interest/interest category to the user. Thus, the user may be more or less interested in items and/or categories comparative to other items/categories. For example, a user may make one or two purchases related to a certain item or a certain item category; however, the same user may make 10-20 purchases related to another item/category. Thus, the user may be considered to be "more" interested in the second item/category. The strength of the interest level may be assigned an amount or other quantifier, which may be used to determine a weight or indicator for the related interest or category of interest. The interest level may be affected by how recent the user actions related to the interest/interest category are in the user data. Thus, if the user trends towards more actions with regard to a certain interest/category recently, the user may be "more" interested in that category/interest. The interest level may further be dynamic based on changing user data, such as increased or decreased user actions with respect to an interest or interest category.

Similarly, the payment provider may access user data for a plurality of users and process the user data as described above to determine dynamic user profiles for each of the plurality of users. The payment provider may utilize the processed user data to associate each of the users with interests and/or interest categories. Each of the plurality of users may have more than one interest and/or category of interest. Thus, the payment provider may associate two or more of the plurality of users with each other when the two or more users share the same interest and/or category of interest. Moreover, based on those two or more users sharing one interest/category, other interests/categories that the users further share may be determined. The payment provider may link the shared interests and/or categories of interests based on the common interests/categories of interest for the users. The payment provider may determine a strength of connection for two or more interests and/or categories of interest based on a number of users in common. The interests and/or categories of interests may normally be unrelated (e.g., food choice and political stance) but may be related based on shared users, such as an increased number of users sharing the same preference in candy bars to political stance.

Utilizing the aforementioned data, the payment provider may determine upcoming interests for the user. In various embodiments, the upcoming interests may be related to potential purchases of the user at some future time. For example, if the user data indicates that a user interest is in exercise, and the user is trending to more hiking, the user may be interested in hiking gear or shoes. Similarly, the user may be interested in outdoor exercise, and may be interested in camping equipment, mountain biking, or other items related to outdoor exercise. Moreover, if the user data indicates that the user has a potential upcoming event (e.g., graduation of a college the user may be interested in attending), the user may be interested in graduation items and information. Thus, upcoming interests may be the same in category or related items based on the user data. Additionally, the upcoming interests may be also be determined for the user using the interests/categories of interest that are linked based on shared users from the plurality of users. Thus, an upcoming interest of the user may be unrelated to the interest/category of interest, but based on shared interests for a plurality of users. Moreover, the upcoming interest may also include an interest strength based on the user's interest level in the interest/category and/or the strength of the link between users sharing the same interests/categories of interest.

The upcoming interests may correspond to new interests of the user, which may be an ongoing potential interest of the user. For example, if the user is trending to purchases at a certain location, the user may be interested in merchant associated with that location. However, the upcoming interests may also be time based. In such embodiments, if the upcoming interest is limited by occurring for a certain amount of time (e.g., a vacation, graduation, etc.), the upcoming interest may only be associated with the user for that limited amount of time. The upcoming interests may also be associated with a likelihood that the user will respond to the upcoming interest. The likelihood may be based on the interest level in the current interests of the user and the user's trends, as well as whether the current interest is a "fad" or otherwise expected to be short-lived and how recent the interest is to the user (e.g., one in which the user has had a long history of interest may not yield as many marketing opportunities as compared to one in which the user is just starting to show interest).

Utilizing the upcoming interests and the likelihood of response to the upcoming interests as well as the recentness of the interest, the payment provider may determine one or more offers for the user. The offers for the user may correspond to potential purchases by the user for one or more items (e.g., products and services, hereinafter referred to as an "item" or "items") related to the upcoming interests of the user. The offers may correspond to an advertisement, as well as purchase benefits for the item(s). The offers may be communicated to the user through the user's communication device. The user may further view the offers and respond to the offers, for example, by purchasing the item(s), deleting the offer(s), or otherwise indicating a like/dislike of the item(s)/offer(s). Using the user's response to the item(s)/offer(s), the payment provider may update the user data. The user data may be further updated using the user's response as well as new user data collected for the user (e.g., new user actions captured by one or more other devices/servers).

The dynamic user profile may further be responsive to changes in the user data. Thus, as the user data includes the user's responses and/or new user actions of the user, the user's profile may be adjusted and new interests/categories may be determined. Additionally, interests and/or categories that the user has not been associated with for a certain amount of time may be removed or devalued in the user's profile. Moreover, the weights assigned to interest levels in the dynamic user profile may also be adjusted based on the changes in the user data. The payment provider may then provide new offers based on the new data, which may correspond to additional items based on changing interests of the user determine in a manner similar to above. Thus, the offers may change over time based on updates to the user data.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a payment provider server 130, and a service provider server 150 in communication over a network 170. User 102 may utilize communication device 110 to utilize the various features available for communication device 110, which may include processes and/or applications to generate user data. For example, communication device 110 may allow for user 102 to perform online user actions with service provider server 150, which may include services offered by service provider server 150 (e.g., messaging, social networking interactions, etc.). In other embodiments, the online user actions may correspond to payment provider server 130, which may include payment services provided by payment provider server 130. Additionally, communication device 110 may generate user data by tracking user actions with devices, modules, and/or processes local to communication device 110. The user actions may be communicated to payment provider server 130 for determination of a dynamic user profile. Payment provider server 130 may then provide offers based on the dynamic user profile or may allow use of the dynamic user profile to one or more other entities, such as merchants.

Communication device 110, payment provider server 130, and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented as a communication device that may utilize appropriate hardware and software configured for wired and/or wireless communication with payment provider server 130 and/or service provider server 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a payment module 120, a user data module 112, other applications 114, a database 116, and a communication module 118. Payment module 120, user data module 112, and other applications 114 may correspond to executable processes, procedures, and/or applications with associated hardware. In other embodiments, communication device 110 may include additional or different modules having specialized hardware and/or software as required.

Payment module 120 may correspond to one or more processes to execute modules and associated devices of communication device 110 to initiate, receive, and/or process/complete transactions using services provided by payment provider server 130. In this regard, payment module 120 may correspond to specialized hardware and/or software utilized by communication device 110 to provide an interface to permit user 102 to select payment options and provide payment for items, for example, to a merchant using payment provider server 130. In various embodiments, payment module 120 may also provide payments and/or transfers to users and/or groups of users, for example, payments to individual sellers or friends for items and/or transfers between known associates. Payment module 120 may be implemented as a user interface enabling user 102 to enter payment options for storage by communication device 110, select and provide payment options on checkout/payment of one or more items with a merchant, and complete a transaction for the item(s) through a purchase request for the item(s). In various embodiments, payment module 120 may include a general browser application configured to retrieve, present, and communicate information over the Internet (e.g., utilize resources on the World Wide Web) or a private network. For example, payment module 120 may provide a web browser, which may send and receive information over network 170, including retrieving website information, presenting the website information to user 102, and/or communicating information to the website, including payment information. However, in other embodiments, payment module 120 may include a dedicated application of payment provider server 130 or other entity (e.g., a merchant), which may be configured to assist in processing purchase requests. Moreover, in other embodiments, payment provider server 130 may not perform transaction processing, and may instead correspond to another service provider (e.g., service provider server 150), where payment module 120 may include processes to access and utilize services provided by such a service provider, for example, another type of account provider that may offer shared and limited authentication for use of an account of user 102 by user 102.

Payment module 120 may be utilized to select payment instrument(s) for use during a transaction between user 102 and the merchant associated with service provider server 150. For example, user 102 may wish to complete a transaction with a merchant to purchase the item. Payment module 120 may utilize user financial information, such as a credit card, bank account, or other financial account, as a payment instrument when providing payment information for use in the authentication mechanism. Additionally, payment module 120 may utilize a user account with payment provider, such as payment provider server 130, as the payment instrument. User 102 may therefore cause a transaction to be generated that includes a payment request to the merchant for one or more items for purchase. The transaction may be communicated to payment provider server 130 for processing. Payment module 120 may be utilized to view the results of the transaction and/or for viewing and storage of a transaction history, such as a receipt. In various embodiments, the aforementioned transaction processing may correspond to a user action, where the details of the user action (e.g., the transaction history) are stored and/or communicated to payment provider server 130 for processing with a dynamic user profile. The user actions may be included in user data processed by payment provider server 130.

User data module 112 may correspond to one or more processes to execute modules and associated specialized hardware of communication device 110 that may be used to locally track user actions and other user data for user 102 and provide the user data to payment provider server 130 for processing to determine a dynamic user profile. In this regard, payment module 120 may correspond to specialized hardware and/or software utilized by communication device 110 to collect, capture, and/or otherwise determine user data for user 102 by monitoring user 102's actions. User 102's actions may correspond to locations of user 102, which may further be determined using a location determination system, such as a GPS module of communication device 110 and associated systems. In other embodiments, user 102's actions may correspond to biometrics, exercise data, and/or nutritional information, which may be input by user 102 and/or captured with the assistance of a connected device, such as a pedometer (e.g., a FITBIT® or similar device using a short range wireless communication with communication device 110). In various embodiments, user data module 112 may determine the user data provided to payment provider server 130 using other applications and/or processes of communication device 110, including messaging applications (e.g., email, SMS/MMS, instant messaging, and/or social networking messaging), Internet browsers, Internet search engines, social networking applications, merchant and shopping applications, travel applications (e.g., travel fare reservation and purchasing applications including air travel, as well as local travel applications for utilizing subways, taxis, car rentals, and other transportation local to user 102), and/or mapping applications. Additional user actions captured by user data module 112 may include media viewing applications, video games, word processors and associated applications, and/or other types of modules, processes, and applications which may track and/or determine user 102's actions. User data module 112 may then provide the user actions and other user data (e.g., personal, financial, and other user information) to payment provider server 130 for processing.

In various embodiments, one or more of the discussed hardware and/or software features of payment module 120 and user data module 112 may be included in the same module.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications. Other applications 114 may also include other location detection applications, which may be used to determine a location for user 102, such as a mapping, compass, and/or GPS application, which can include a specialized GPS receiver that obtains location information for communication device 110 and processes the location information to determine a location of the device. Other applications may include social networking applications, media viewing, and/or merchant applications. Other applications 114 may also be associated with other devices, such as biometric devices and other types of accessible or connected devices. Other applications 114 may be utilized by user data module 112 to determine user data, which may be communicated to payment provider server 130. Other applications 114 may include device interfaces and other display modules that may receive input from user 102 and/or output information to user 102. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment module 120 and/or other applications 114, identifiers associated with hardware of communication device 110, or other appropriate identifiers, such as identifiers used for payment/user/device authentication or identification, which may be communicated as identifying user 102/communication device 110 to payment provider server 130 and/or service provider server 150. Database 116 may include location information, such as obtained through the GPS receiver, which may be transmitted to payment provider server 130 and/or service provider server 150, as well as biometrics and other determined or retrieved information (e.g., user actions).

Communication device 110 includes at least one communication module 118 adapted to communicate with payment provider server 130 and/or service provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Payment provider server 130 may be maintained, for example, by an online payment service provider, which may provide payment services and/or processing for financial transactions on behalf of users. In this regard, payment provider server 130 includes one or more processing applications which may be configured to interact with communication device 110, service provider server 150, and/or another device/server to facilitate payment for a transaction, including establishment of payment accounts and/or loyalty accounts and determination of dynamic user profiles for one or more users (e.g., user 102). In one example, payment provider server 130 may be provided by PAYPAL®, Inc. of San Jose, Calif., USA. However, in other embodiments, payment provider server 130 may be maintained by or include a credit provider, financial services provider, financial data provider, and/or other service provider, which may provide payment services to user 102.

Payment provider server 130 of FIG. 1 includes a dynamic user profile module 140, a transaction processing module 132, other applications 134, a database 136, and a network interface component 148. Dynamic user profile module 140, transaction processing module 132, and other applications 134 may correspond to executable processes, procedures, and/or applications with associated hardware. In other embodiments, payment provider server 130 may include additional or different modules having specialized hardware and/or software as required.

Dynamic user profile module 140 may correspond to one or more processes to execute modules and associated specialized hardware of payment provider server 130 to access user data for user 102, determine a dynamic user profile for user 102 having current user interests and current user trends for user 102, and determine an upcoming interest for user 102 using the dynamic user profile, which in certain embodiments, may further utilize user data for a plurality of other users. In this regard, dynamic user profile module 140 may correspond to specialized hardware and/or software to first access user data for user 102 received by payment provider server 130. The user data may correspond to user actions by user 102, which may include transactions, interactions with other users, life actions (e.g., biometrics, past and future events, locations visited or for travel to, etc.), and other user actions. The user data may further include a frequency of the user actions, a length of the user actions, and other data and metadata related to the user actions. For example, the user data may include that user 102 visited a certain location, as well as the length of visit, the persons visited at the location, and a number of visits to the location. In other embodiments, the user data may include a transaction, as well as transaction information about a purchase amount, merchant location, items purchased, frequency of the same or similar purchases, etc. Other types of user data with related information may correspond to online and real world interactions (e.g., social networking interactions, meetings, etc.), travel, etc.

Using the user data, dynamic user profile module 140 may determine a dynamic user profile for user 102. The dynamic user profile may include current user interests for user 102 and current user trends for user 102. The current user interest may include interest areas for user 102, which may correspond to various levels of abstraction, including interests in a single item and/or interests in a grouping or larger taxonomy of items. For example, a current user interest for user 102 may correspond to a specific interest and/or a larger category of interest (e.g., an interest in an organic apples and/or an interest in "health food," respectively). The current user interests may be determined from the user data, for example, if an item or category of items appears in the user data. For example, a purchase of an organic apple may appear in a transaction history within the user data. In other embodiments, the current user interests may be inferred from the user data. In such embodiments, if the user visits an organic food merchant, the user may be interested in the interest category of organic or health food.

Additionally, a frequency of occurrence of the interest and/or category of interest and a corresponding time of occurrence for each appearance of the interest and/or category of interest in the user data may be determined by dynamic user profile module 140. The frequency of occurrence and time of occurrence may be used to determine current user trends for user 102 corresponding to the current user interest for user 102. Current user trends for user 102 may include trending information for user 102, such as whether a specific interest or category of interest is occurring more or less frequently in the user data. For example, if user 102 is purchasing more often at a certain merchant location, a trend for the user may be associated with that specific merchant location. In other embodiments, the trend may also be time related, where a current user trend for user 102 may correspond to an increased or decreased occurrence of purchases at a merchant location recently, comparative to past purchases. Thus, the current user trends may also relate to over time changes in the user data. In various embodiments, the current user trends and other user data may be used to determine an interest level for user 102 in each of the interest areas of the user.

The dynamic user profile may include the current user interests and the current user trends for user 102. Dynamic user profile module 140 may determine an upcoming interest for user 102 based on the dynamic user profile. The upcoming interest for the user may correspond to a potential or prospective interest for user 102 that user 102 may be currently interested in or interested in at a future time. The upcoming interest may correspond to another interest area outside of the current user interests, such as a specific interest or a category of interests. The upcoming interest may further correspond to a potential purchase by user 102 now or at a future time. The upcoming interest may be determined using the current user interests and the current user trends, as well as associated interest areas determined using the current user interests and the current user trends. For example, a specific interest for user 102 may correspond to an APPLE® mobile phone determined from a purchase of an APPLE® mobile phone. Thus, an upcoming interest may correspond to interest areas related to the APPLE® mobile phone, including phone accessories, data/rate plans, insurance coverage, device applications, etc. The upcoming interest may further be determined using additional current user interests as well as current user trends. In such embodiments, if user 102 has purchased the APPLE® mobile phone and has begun to exercise frequently, the upcoming interest may be for an exercise tracking module for the APPLE® mobile phone, a FITBIT®, or other upcoming interest. Moreover, if the exercise trends to one specific type of exercise, the upcoming interest may be particular to that area over past areas of exercise by user 102 that user 102 has performed less frequently recently than in the past.

In further embodiments, dynamic user profile module 140 may determine dynamic user profiles for a plurality of different users. The dynamic user profiles for the different users may be used to determine interest areas for each of the different users. Additionally, dynamic user profile module 140 may determine a number of users interest in each of the interest areas. For example, a first interest area may include 20 users, while a second interest area may include 50 users. Dynamic user profile module 140 may further determine links between the interest areas by determining users in common between interest areas. For example, the first interest area may share 10 users in common with the second interest area. Similarly, a third, fourth, and fifth interest area may share 20 users in common. Dynamic user profile module 140 may utilize the links to determine upcoming interests for user 102. Thus, if user 102 is interested in the first interest area, user 102 may also be interested in the second interest area. Similarly, if user 102 is interested in the third interest area, user 102 may be interested in both the fourth and fifth interest areas. The linked interest areas may not have anything normally in common and only be linked based on the shared users in common between the interest areas. However, in other embodiments, the linked interest areas may be required to share at least a higher taxonomy class to further link the interest areas. Dynamic user profile module 140 may determine a strength level for each of the links based on a number of users in common between the interest areas. In various embodiments, dynamic user profile module 140 may update the strength of the link based on user responses to determination of the upcoming link based on shared response. For example, if user 102 is provided an offer or advertisement based on the upcoming interest determined based on linked interest areas but does not respond or indicates a dislike, the strength level of the link may be decreased, thereby showing that the link may be mere coincidence.

Dynamic user profile module 140 may further determine a likelihood of response to upcoming interest and/or an offer provided to user 102 based on the upcoming interest. The likelihood of response may be based on the current interests and the current trends of the user. For example, if user 102 is trending to shopping at high end clothing stores but has an interest in environmental conservation, thus linking user 102 to recycling and reuse, dynamic user profile module 140 may determine it is unlikely that user 102 will respond to an advertisement for clothes at a swap meet or flea market. Conversely, if user 102 is linked to retro clothing and video games, dynamic user profile module 140 may determine it is likely user 102 will respond to a similar advertisement for vintage electronics and games at the swap meet or flea market. Using the upcoming interest and the likelihood of response, dynamic user profile module 140 may provide information associated with the upcoming interest to user 102. The information may include advertisements, offers, benefits (e.g., discounts), and/or other information related to the upcoming interest.

In various embodiments, dynamic user profile module 140 may receive a reaction by user 102 to the information provided by the upcoming interest. The reaction may correspond to an approval or disproval of the upcoming interest. For example, user 102 may indicate approval by clicking on a link, purchasing an item, reading a message, clicking an approval signifier (e.g., a thumbs up icon), other through another approval mechanism. User 102 may also indicate disproval by deleting the message, not purchasing or following a link, or clicking a disproval signifier (e.g., a thumbs down icon). Dynamic user profile module 140 may utilize the response to change the current user interest, the interest levels in the current user interests, and/or the likelihood of response for user 102 in the dynamic user profile. Moreover, dynamic user profile module 140 may receive updated user data, such as new user actions, which may further alter the dynamic user profile by changing the current user interest, the interest levels in the current user interests, and/or the likelihood of response for user 102 in the dynamic user profile. Thus, as additional data is received by dynamic user profile module 140, the dynamic user profile for user 102 may be adjusted to reflect new and changing user interests by allowing for determination of additional upcoming interest for user 102.

In various embodiments, dynamic user profile module 140 may utilize a user loyalty account to collect data for user 102 and/or provide the information about upcoming interests to user 102. The loyalty account may further provide benefits in the upcoming user interests, and may be utilized with a payment account provided by transaction processing module 132. Transaction processing module 132 may correspond to one or more processes to execute modules and associated specialized hardware of payment provider server 130 to receive and/or transmit information from communication device 110 for establishing payment accounts for user 102 and processing one or more transactions initiated by user 102. In this regard, transaction processing module 132 may correspond to specialized hardware and/or software to establish payment accounts, which may be utilized to send and receive payments and monetary transfers and engage in other financial transactions. User 102 may establish a payment account with transaction processing module 132 by providing personal and/or financial information to payment provider server 130 and selecting an account login, password, and other security information. The payment account may be accessed and/or used through a browser application and/or dedicated payment application executed by communication device 110, such as an application associated with payment module 120. Thus, payment provider server 130 may protect and limit use of the payment account or other payment services offered by payment provider server 130 using authentication required by user 102. In other embodiments, payment provider server 130 may correspond to another type of service provider and transaction processing module 132 may correspond to another type of service module, which may require authentication for use of the payment account, as discussed herein.

Transaction processing module 132 may further process a received transaction from service provider server 150 by receiving the transaction having a payment request for a payment for the transaction. The payment request may correspond to a payment token, including the authentication mechanism (e.g., user login, password, and/or PIN) and identification of the transaction, and may be encrypted prior to transmission to transaction processing module 132 to prevent unauthorized receipt of a payment instrument. The payment token may include information corresponding to user/merchant identifiers, transaction information and/or other information. Additionally, the payment token may include a payment amount as a payment request and terms of payment for the transaction. Once the transaction is received and user 102 is authenticated, transaction processing module 132 may utilize the payment account for user 102 to render payment for the transaction if the authentication mechanism matches the required authentication. Payment may be made to service provider server 150 or another user device using the payment instrument and the terms of the payment request, or may be made to an account for a merchant associated with service provider server 150. Additionally, transaction processing module 132 may provide transaction histories, including receipts, to communication device 110 and/or service provider server 150, or may store the transaction histories to the user 102's account and/or the merchant's account.

In various embodiments, payment provider server 130 includes other applications 134 as may be desired in particular embodiments to provide features to payment provider server 134. For example, other applications 134 may include security applications for implementing server-side security features, programmatic client applications for interfacing with appropriate application programming interfaces (APIs) over network 170, or other types of applications. Other applications 134 may contain software programs, executable by a processor, including a graphical user interface (GUI), configured to provide an interface to user 102 when accessing payment provider server 134, where user 102 or other users may interact with the GUI to more easily view and communicate information. In various embodiments where not provided by transaction processing module 132, other applications 134 may include connection and/or communication applications, which may be utilized to communicate information to over network 170.

Additionally, payment provider server 130 includes database 136. As previously discussed, user 102 and/or the merchant corresponding to service provider server 150 may establish one or more payment accounts with payment provider server 130. Payment accounts in database 136 may include user/merchant information, such as name, address, birthdate, payment/funding information, additional user financial information, and/or other desired user data. User 102 and/or the merchant may link to their respective payment accounts through an account, user, merchant, and/or device identifier. Thus, when an identifier is transmitted to payment provider server 130, e.g. from communication device 110 and/or service provider server 150, a payment account belonging to user 102 and/or the merchant may be found. Database 136 may also store a dynamic user profile for user 102, as well as information used to determine the dynamic user profile, such as user data, updated or new user data, and/or user responses to advertisements, offers, and other information provided for upcoming interest for user 102. Thus, information determined using the dynamic user profile for user 102, such as upcoming interest for user 102 and offers associated with the upcoming interests may also be stored to database 136.

In various embodiments, payment provider server 130 includes at least one network interface component 148 adapted to communicate communication device 110 and/or service provider server 150 over network 170. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Service provider server 150 may be maintained, for example, by an online service provider, which may provide one or more services to user 102. In this regard, service provider server 150 includes one or more processing applications which may be configured to interact with communication device 110, payment provider server 150, and/or another device/server to provide the service to user 102 and generate user data for user 102 based on user 102's use of the service. In one example, service provider server 150 may be provided by EBAY®, Inc. of San Jose, Calif., USA or STUBHUB®, Inc. of San Francisco, Calif., USA. However, in other embodiments, service provider server 150 may be maintained by or include other types of service providers, such as merchants, messaging services, social networking systems, etc. Although a service provider server is shown, the service provider server may be managed or controlled by any suitable processing device. Although only one service provider server is shown, a plurality of service provider server may function similarly.

Service provider server 150 of FIG. 1 contains a service module 152, other applications 154, a database 156, and a communication module 158. Service module 152 and other applications 154 may correspond to processes, procedures, and/or applications executable by a hardware processor, for example, a software program. In other embodiments, service provider server 150 may include additional or different modules having specialized hardware and/or software as required.

Service module 152 may correspond to one or more processes to execute modules and associated specialized hardware of service provider server 150 to provide a service to user 102, generate and collect user data based on user 102's actions using the service, and provide the user data to payment provider server 130. In this regard, service module 152 may correspond to specialized hardware and/or software of service provider server 150 to first provide a service utilized by user 102. In various embodiments, the service may correspond to a messaging, social networking, travel, transportation, shopping, searches and search engines, shopping, purchasing, media viewing, video playback, or other types of service. User 102 may utilize the service, such as by performing user actions, including messaging friends, posting to a social network, arranging travel, etc. Based on the user actions, service module 152 may generate user data for user 102, which may be provided to payment provider server 130. The user data may include transactions, interactions, life events, and other types of actions that user 102 has performed or will perform. The user data may be used to determine the dynamic user profile, as discussed herein.

Service provider server 150 includes other applications 154 as may be desired in particular embodiments to provide features to service provider server 150. For example, other applications 154 may include security applications for implementing client-side security features, programmatic client applications for interfacing with appropriate application programming interfaces (APIs) over network 170, or other types of applications. Other applications 154 may also include email, texting, voice and IM applications that allow a user to send and receive emails, calls, texts, and other notifications through network 170. In various embodiments, other applications 154 may include financial applications, such as banking, online payments, money transfer, or other applications associated with payment provider server 130. Other applications 134 may contain software programs, executable by a processor, including a graphical user interface (GUI) configured to provide an interface to the user.

Service provider server 150 may further include database 156 which may include, for example, identifiers such as operating system registry entries, cookies associated with service module 152 and/or other applications 154, identifiers associated with hardware of service provider server 150, or other appropriate identifiers, such as identifiers used for payment/user/device authentication or identification. Database 156 may further include a user data, including user actions by user 102 using the service provider by service module 152. The information associated with the user actions by user 102 may be communicated to payment provider server 130 from database 156.

Service provider server 150 includes at least one communication module 158 adapted to communicate with communication device 110 and/or payment provider server 130. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
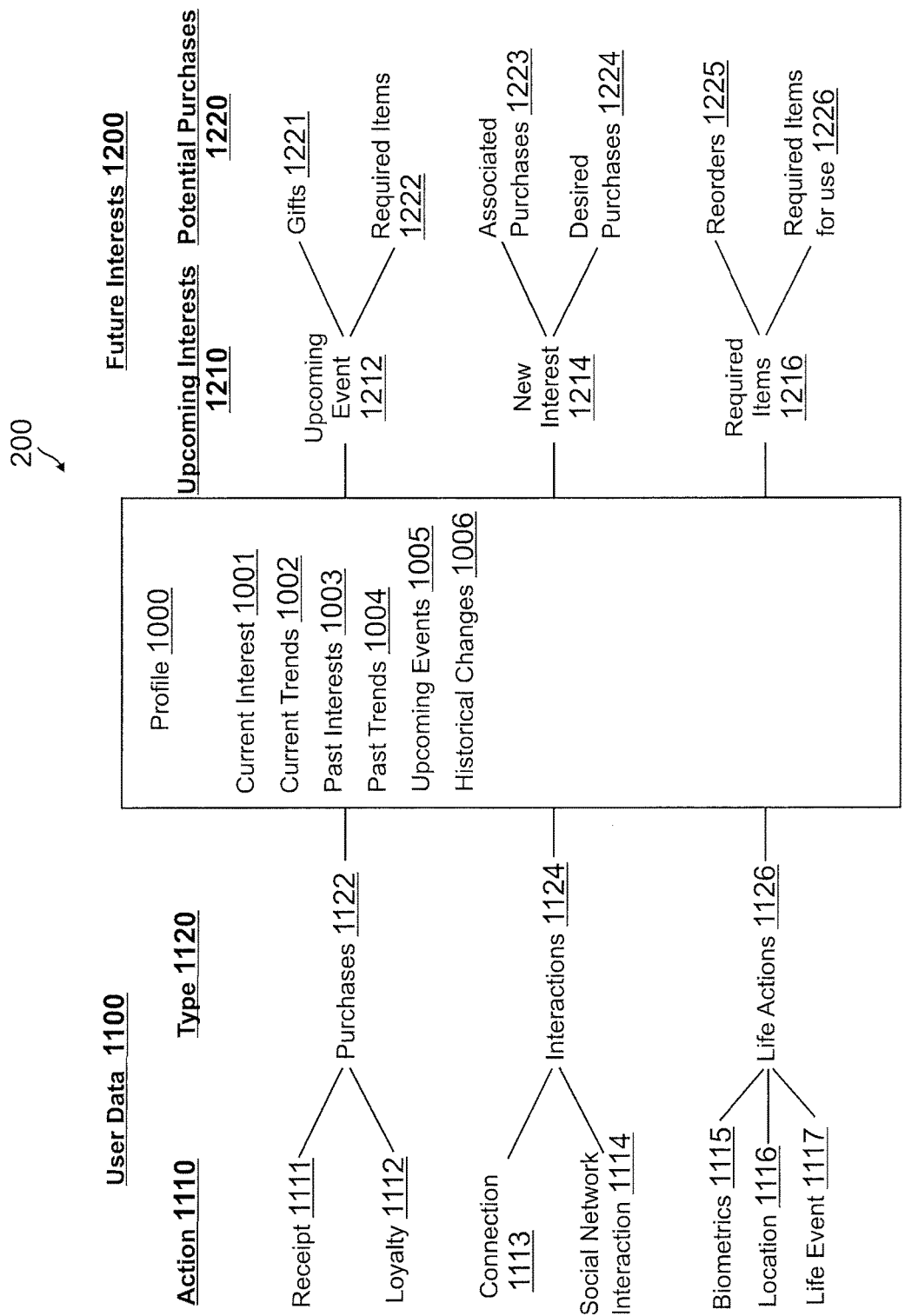
FIG. 2 is an exemplary user profile for a user that is determined from user actions and used for predictive analysis of potential purchases at a future time for the user, according to an embodiment.

FIG. 2 is an exemplary user profile for a user that is determined from user actions and used for predictive analysis of potential purchases at a future time for the user, according to an embodiment. Environment 200 includes a profile 1000 determined using dynamic user profile module 140 of payment provider server 130 in FIG. 1. Additionally, environment 200 includes user data 1100 provided at least in part by service module 152 of service provider server 150 in FIG. 1.

User profile 1000 in environment 200 may be determined using user data 1100. In this regard, a processing module (e.g., dynamic user profile module 140 of FIG. 1) may receive user data 1100, which may include action 1110. Action 1110 may correspond to a user action by the user associated with user data 1100. Thus, action 1110 may include one or more of a receipt 1111 for a transaction, loyalty 1112 for one or more loyalty programs with a service provider or merchant, connection 1113 with another user (e.g., a contact list entry and/or a communication with the other user), a social networking interaction 1114 (e.g., a posting, message, like or dislike of another posting, etc.), biometrics 1115 for the user, location 1116 for the user, and/or life event 1117 for the user. Each of action 1110 may correspond to a specific interest for the user, which may be included in the details of each of action 1110. Additionally, each of action 1110 may be associated with a type 1120, which may be used to determine an interest category for the user. For example, type 1120 includes purchases 1122, interactions 1124, and life actions 1126. In various embodiments, interactions 1124 may include interactions with a device, using the web (e.g., over the Internet), and/or using an interface of one or more devices and/or accessible interfaces over the Internet. For example, a user interest in a topic and/or category may be interfered based on the user's interactions with a device, over the web, and/or through an interface. In this regard, if the user interacts with an advertisement, offer, and/or message through the device, over the web, or through an interface, the user may be more interested in the category or topic of the advertisement/offer/message, or other related information for the advertisement/offer/message (e.g., merchant, sender, etc.). In further embodiments, the level of interaction may also be judged in the advertisement/offer/message, such as a length of interaction, quality of interaction, number of user inputs regarding the interaction, and positive or negative feedback with the interaction. Interactions 1124 may also include social networking interactions and level of social networking interactions, such that various types, degrees, and actions through a social network may affect interactions 1124 and used to determine a user interest in a category or topic in profile 1000.

Using the aforementioned data, profile 1000 may be determined. Profile 1000 includes current interests 1001, current trends 1002, past interests 1003, past trends 1004, upcoming events 1005, and historical changes 1006. In this regard, current interests 1001 may correspond to specific interests for the user determined using one or more of action 1110. Additionally, current interests 1001 may also include interest categories, which may be determined from one or more of action 1110 and type 1120. Current interests 1001 and current trends 1002 include present interests and trends within profile 1000. However, profile 1000 may also include past interests 1003 and past trends 1004 corresponding to past interests and trends for the user based on past user data. Profile 1000 may include past interests 1003 and past trends 1004 to view how changes in the user's interests have evolved over time, which may be included in historical changes 1006. Historical changes 1006 may further be affected by upcoming events 1005, which may include information about potential events for the user.

Moreover, using the information within profile 1000, future interests 1200 may be determined. Future interests 1200 include upcoming interests 1210 and potential purchases 1220. Upcoming interests 1210 may correspond to specific interests and/or categories of interest, which may include an upcoming event 1212 (e.g., an event the user may be interested in attending), a new interest 1214 (e.g., a new interest area for the user based on current interest areas and/or linked interest areas), and required items 1216 (e.g., items required or suggested for a current interest area). Additionally, each of upcoming interest 1210 may be associated with one or more potential purchases 1220, such as gifts 1221 and required items 1222 for upcoming event 1212. Potential purchases 1220 for new interest 1214 may include associated purchases 1223 and/or desired purchases 1224. Moreover, potential purchases 1220 for required items 1216 may include reorders 1225 and/or use items 1226.

Figure 3:
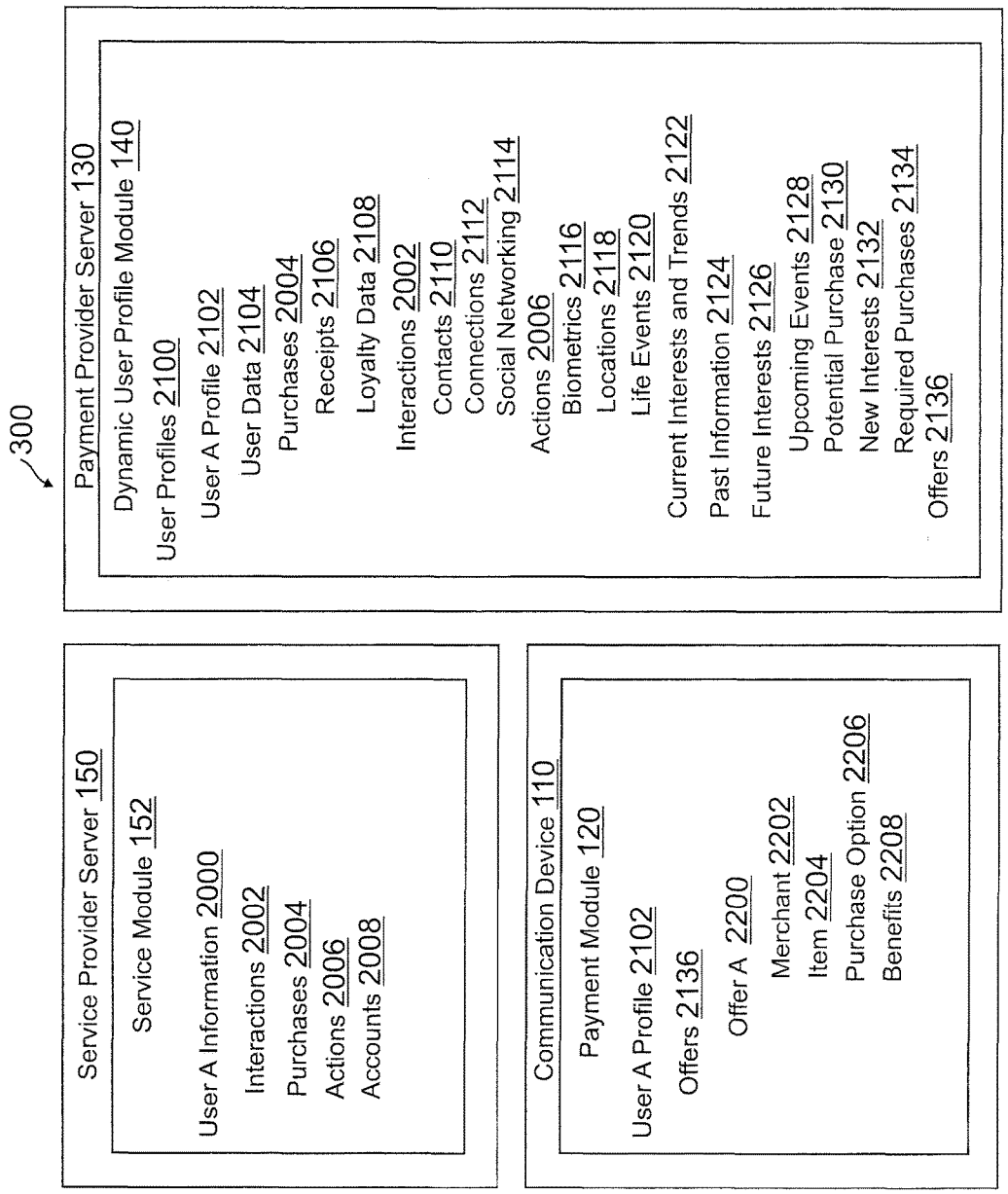
FIG. 3 is an exemplary interaction between a service provider's server, a payment provider's server, and a communication device for determining a dynamic user profile, according to an embodiment.

FIG. 3 is an exemplary interaction between a service provider's server, a payment provider's server, and a communication device for determining a dynamic user profile, according to an embodiment. Environment 300 of FIG. 3 includes communication device 110, a payment provider server 130, and a service provider server 150 from environment 100 of FIG. 1 executing module and processes discussed in reference to environment 100.

Service provider server 150 executes service module 152 corresponding generally to the specialized hardware and/or software modules and processes described in reference to FIG. 1. In this regard, service module 152 may be used to generate user data for a user when the user performs user actions using a service provided by service module 152. For example, service module 152 may include user A information 2000, which may be generated from user A's use of service module 152. In this regard, service module 152 may establish interactions 2002 with user A information 2000, such as interactions with one or more other users. Additionally, user A information 2000 may include purchases 2004 with one or more other users and/or merchant. User A information 2000 may also include actions 2006 (e.g., user online and/or real world actions tracked by a device or online service provider or a device local to user 102) and accounts 2008 (e.g., payment accounts and/or loyalty accounts, which may generate user data from user A's use of accounts 2008).

Payment provider server 130 executes dynamic user profile module 140 corresponding generally to the specialized hardware and/or software modules and processes described in reference to FIG. 1. In this regard, dynamic user profile module 140 may include received and/or accessed information about a user, as well as processed results from such information. Thus, dynamic user profile module 140 includes user profiles 2100, such as user A profile 2102. In order to determine user A profile 2102, user data 2104 may be collected, such as from service provider server 140 and, in various embodiments, communication device 110. User data 2104 includes purchases 2004, for example, receipts 2106 and loyalty data 2108. Additionally, user data 2104 includes interactions 2002 and actions 2006. Interactions may include data based on contacts 2110, connections 2112, and/or social networking 2114. Moreover, actions 2006 may include biometrics 2116 for user A, locations 2118 visited by user A (as well as length of frequency of visit), and life events 2120 (e.g., upcoming vacation, travel, attended events, etc.).

Using user data 2104, dynamic user profile module 140 may determine current interests and trends 2122 in user A profile 2102. Dynamic user profile module 104 may then determine future interests 2126, which may further be determined using past information 2124. Future interests 2126 may also include upcoming events 2128, potential purchases 2130, new interests 2132, and/or required purchases 2134. The information for future interests 2126 may also guide generation of offers 2136, which may be communicated to communication device 110 for presentation to user A.

Communication device 110 executes payment module 120 corresponding generally to the specialized hardware and/or software modules and processes described in reference to FIG. 1. In this regard, payment module 120 may generate user data, such as purchases 2004 in user data 2104. Additionally, payment module 120 may display offers 2136 to user A. For example, offers 2136 may include offer A 2200, which may display information for a merchant 2202 and an item 2204. Payment provider server 130 may further provide a payment option 2206 and benefits 2208 for offer A 2200.

Figure 4:
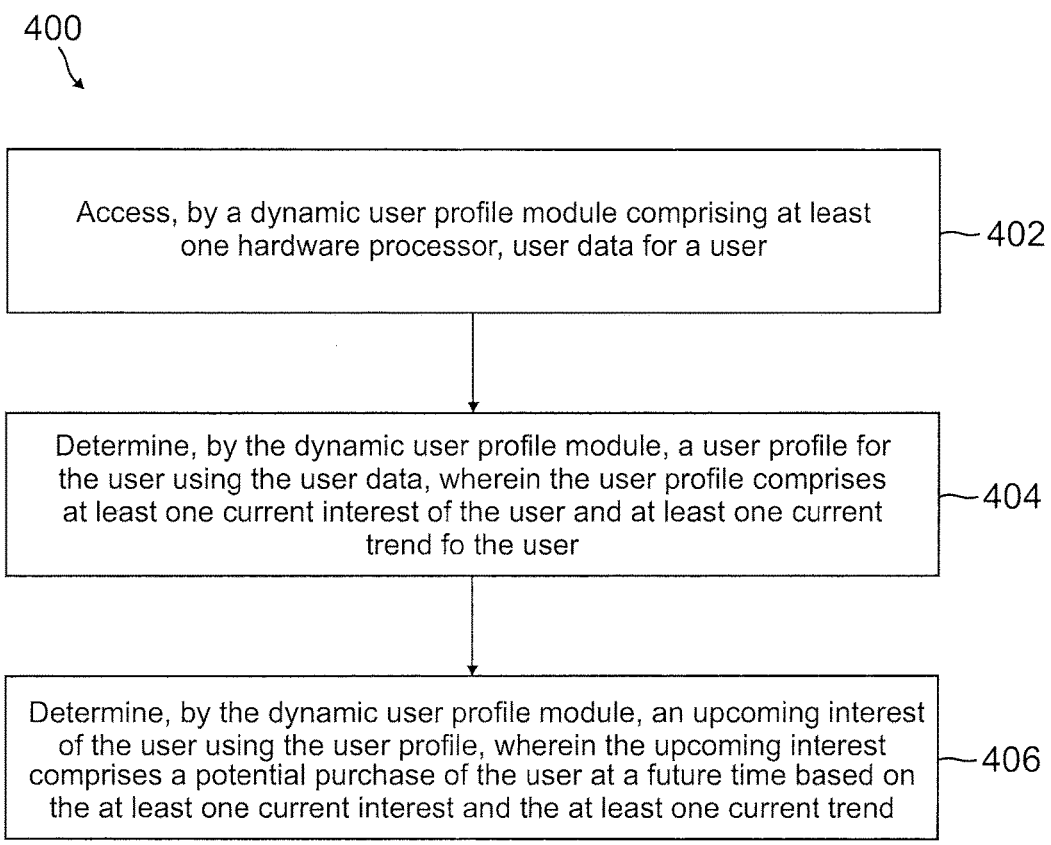
FIG. 4 is a flowchart of an exemplary process for processing available user data to determine a user profile for use in anticipating changing user interests and determining potential user purchases, according to an embodiment.

FIG. 4 is a flowchart of an exemplary process for processing available user data to determine a user profile for use in anticipating changing user interests and determining potential user purchases, according to an embodiment. Note that one or more steps, processes, and methods described herein may be omitted, performed in a different sequence, or combined as desired or appropriate.

At step 402, user data for a user is accessed, by a dynamic user profile module comprising at least one hardware processor. The user data may include actions for the user, such as at least one purchase, interaction, and event for the user. A user profile for the user is determined, by the dynamic user profile module, using the user data, by the dynamic user profile module, wherein the user profile comprises at least one current interest of the user and at least one current trend of the user, at step 404. The profile may be dynamic so that the profile is response to change in user data defining the current interest and the current trend of the user. For example, changes to the actions may alter the dynamic user profile. Moreover, responses to sales offers provided using the dynamic user profile may alter the dynamic user profile.

In various embodiments, the current user interest(s) may comprise interest areas for the user, wherein the interest areas comprise at least one of a specific interest of the user and an interest category of the user. For example, a specific interest of the user may comprise an item, a descriptor, an action, and a single entity. Similarly, an interest category of the user may comprise a class of items, a grouping of descriptors, an activity, a brand, and a collective type of entities.

The dynamic user profile module may further determine interest levels in each of the interest areas using the current user trends and the user data, wherein the interest levels in the each of the interest areas indicates an importance of the each of the interest areas to the user in the dynamic user profile. The interest levels in the each of the interest areas may be adjusted based updated user data (e.g., new user actions and/or reactions to offers). The adjusted interest levels may change the importance of the each of the interest areas to the user in the dynamic user profile.

At step 406, an upcoming interest of the user is determined using the user profile, by the dynamic user profile module, wherein the upcoming interest comprises a potential purchase of the user at a future time based on the at least one current interest and the at least one current trend. The upcoming interest may be different than the current user interests of the user, wherein the upcoming interest is related to the current user interests based on the current user trends. The upcoming interest may be determined based on at least one of the interest levels in the each of the interest areas The dynamic user profile module may further determine a plurality of separate interest areas for a plurality of users and determines links between the plurality of separate interest areas based on common users shared by at least two of the plurality of separate interest areas. For example, a first link of the links may comprise at least two common interest areas for a first general user of the plurality of users shared with a second general user of the plurality of users. In other embodiments, a second link of the links may comprise a first interest area and a second interest area, wherein the first interest area is shared by a first general user and a second general user, and wherein the second interest area is further shared by the first general user and the second general user. The upcoming interest for the user may be further determined using the first/second link, wherein one of the current user interests comprises the first interest area, and wherein the upcoming interest comprises the second interest area. The dynamic user profile module may further determine strength levels for each of the links based on a number of the common users shared by the at least two of the plurality of separate interest areas. The dynamic user profile module may further update the strength levels based on a change amount of the number of the common users shard by the at least two of the plurality of separate interest areas. A sale offer to provide the user may be determined based on the potential purchase, wherein the sale offer comprises an advertisement for an item associated with the potential purchase. In various embodiments, a loyalty account for the user may be established, wherein the loyalty account generates and provides the user data for the dynamic user profile.

Figure 5:
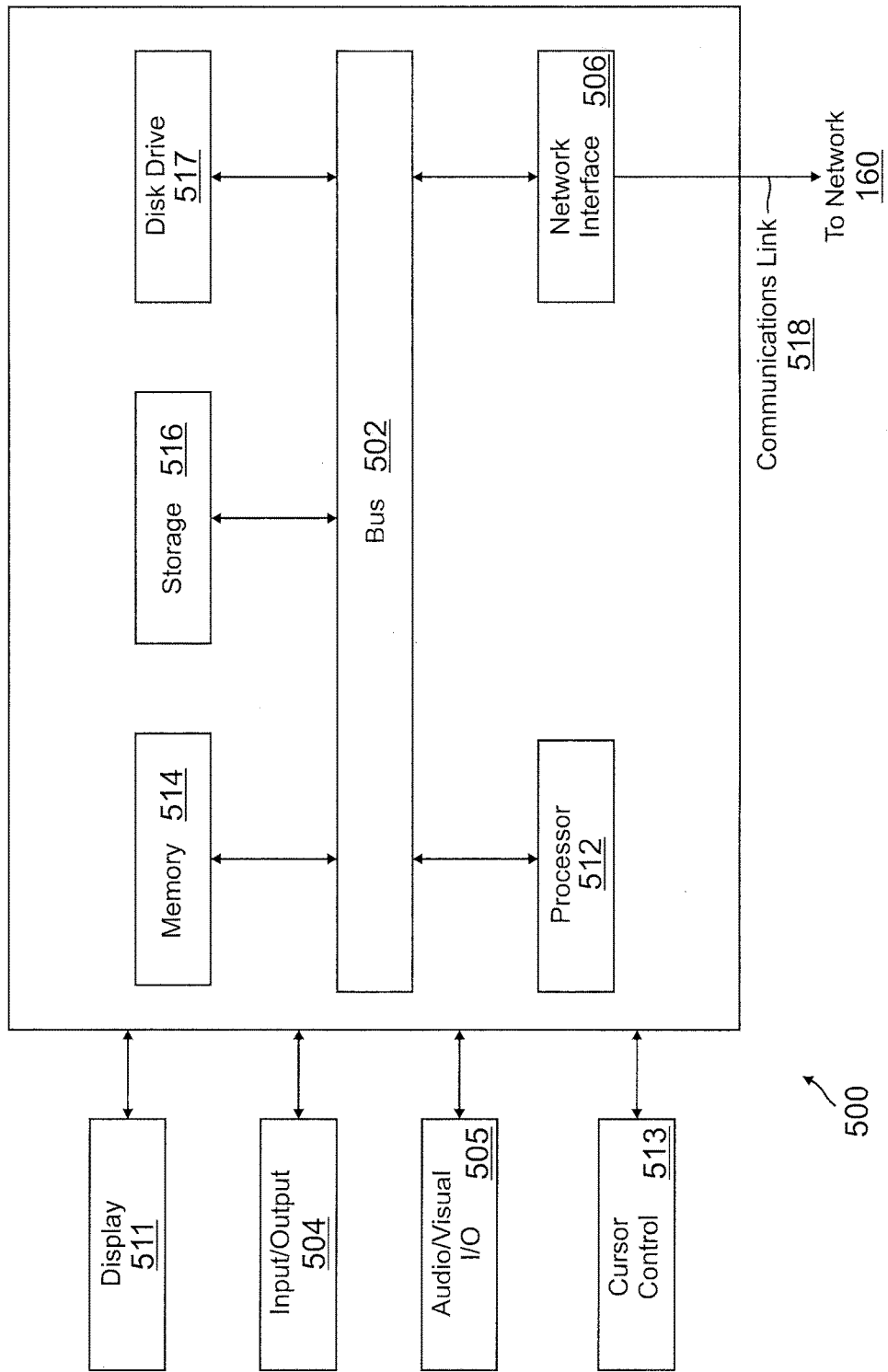
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.)

capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory storing user data and a user profile; and
   one or more hardware processors configured to execute instructions to cause the system to perform operations comprising:
   accessing, by a service provider from an online resource, an online user action performed by a user with the online resource using a communication device;
   requesting, by the service provider from the communication device, first real-world data of the user, wherein the communication device detects the first real-world data of the user using an application executing on the communication device;
   storing, in a database of the service provider, the user data comprising the online user action and the first real-world data for the user;
   in response to receiving second real-world data of the user from the application executing on the communication device after detecting the first real-world data, determining a dynamic user profile for the user, wherein the dynamic user profile comprises a current user interest for the user based on the user data and a current user trend for the user based on the first real-world data and the second real-world data, wherein the current user trend comprises an increase or a decrease in the current user interest based on a change in the first real-world data and the second real-world data;

determining an interest of the user using the dynamic user profile, wherein the interest indicates a potential purchase by the user at a future time; and in response to receiving a first change in the user data, updating the user profile.

2. The system of claim 1, wherein the user data comprises at least one of a purchase, an interaction, or an event for the user.

3. The system of claim 1, wherein the interest is different than the current user interest, and wherein the interest is related to the current user interest based on the current user trend.

4. The system of claim 1, wherein the current user interest comprises interest areas for the user, and wherein the interest areas comprises at least one of a specific interest of the user or an interest category of the user.

5. The system of claim 4, wherein the operations further comprise:

determining interest levels in each of the interest areas using the current user trend and the user data, and wherein the interest levels in the each of the interest areas indicates an importance of the each of the interest areas to the user in the user profile.

6. The system of claim 5, wherein the interest levels in the each of the interest areas are adjusted based the first change in the user data.

7. The system of claim 6, wherein the adjusted interest levels update an importance of the each of the interest areas to the user in the user profile.

8. The system of claim 5, wherein the interest is determined based on at least one of the interest levels in the each of the interest areas.

9. The system of claim 8, wherein the operations further comprise:

determining a plurality of separate interest areas for a plurality of users; and determining links for each of the plurality of separate interest areas with separate ones of the plurality of separate interest areas based on common users shared by each of the plurality of separate interest areas with the separate ones.

10. The system of claim 9, wherein a first link of the links comprises at least two common interest areas for a first user of the plurality of users shared with a second user of the plurality of users.

11. The system of claim 9, wherein a second link of the links comprises a first interest area and a second interest area, wherein the first interest area is shared by a first user and a second user, and wherein the second interest area is further shared by the first user and the second user.

12. The system of claim 11, wherein the interest for the user is further determined using the second link, wherein one of the current user interest comprises the first interest area, and wherein the interest comprises the second interest area.

13. The system of claim 9, wherein the operations further comprise:

determining strength levels for each of the links based on a number of the common users shared by the at least two of the plurality of separate interest areas.

14. The system of claim 13, wherein the operations further comprise:

updating the strength levels based on a second change amount of the number of the common users shared by the at least two of the plurality of separate interest areas.

15. The system of claim 13, wherein the interest category of the user comprises a class of items, a grouping of descriptors, an activity, a brand, or a collective type of entities.

16. The system of claim 4, wherein the specific interest of the user comprises an item, a descriptor, an action, or a single entity.

17. A method comprising:

accessing, by a service provider server from an online resource, an online user action performed by a user with the online resource using a communication device;

requesting, by the service provider server from the communication device, first real-world data for the user, wherein the communication device detects the first real-world data of the user using an application executing on the communication device;

storing, in a database of the service provider server, user data comprising the online user action and the first real-world data for the user;

in response to receiving second real-world data of the user from the application of the communication device after detecting the first real-world data, determining, by the service provider server, a user profile for the user using the user data, wherein the user profile comprises a current interest of the user based on the user data and a current trend of the user based on the first real-world data and the second real-world data, wherein the current trend comprises an increase or a decrease in the current interest based on the first real-world data and the second real-world data; and determining, by the service provider server, an upcoming interest of the user using the user profile, wherein the upcoming interest comprises a potential purchase of the user at a future time based on the user profile.

18. The method of claim 17, further comprising:

determining a sale offer to provide the user based on the potential purchase, wherein the sale offer comprises an advertisement for an item associated with the potential purchase.

19. The method of claim 18, wherein prior to the accessing the user data for the user, the method further comprises:

receiving online transaction information for the user and comprising at least one of a transaction history for the user with a merchant, a benefit for the user with the merchant, or a search by the user for an item;

storing the online transaction information with the user data for the user; and establishing a loyalty account for the user using, wherein the loyalty account provides an offer or a benefit based on the user data, wherein the accessing the user data for the user uses the loyalty account for the user.

20. A non-transitory machine-readable medium having stored thereon machine-readable instructions executable to cause a machine to perform operations comprising:

accessing, by a service provider server from an online resource, an online user action performed by a user with the online resource using a communication device;

requesting, by the service provider server from the communication device, first real-world data of the user, wherein the communication device detects the first real-world data of the user using an application executing on the communication device;

storing, in a database of the service provider server, user data comprising the online user action and the first real-world data for the user;

in response to receiving second real-world data of the user from the application of the communication device after detecting the first real-world data, determining, by the service provider server, a user profile for the user using the user data, wherein the user profile comprises a current interest of the user based on the user data and a current trend of the user based on the first real-world data and the second real-world data, wherein the current trend comprises an increase or a decrease in the current interest based on the first real-world data and the second real-world data; and determining, by the service provider server, an upcoming interest of the user using the user profile, wherein the interest comprises a potential purchase of the user at a future time based on the user profile.

\* \* \* \* \*

UNITED STATES PATENT AND TRADEMARK OFFICE
CERTIFICATE OF CORRECTION

PATENT NO. : 10,091,327 B2  
APPLICATION NO. : 14/822851  
DATED : October 2, 2018  
INVENTOR(S) : Hsiao Chen Page 1 of 1

It is certified that error appears in the above-identified patent and that said Letters Patent is hereby corrected as shown below:

In the Claims

In Column 23, Line 16, Claim 20 change "wherein the" to --wherein the upcoming--.

Signed and Sealed this
Thirtieth Day of July, 2019

Andrei Iancu
*Director of the United States Patent and Trademark Office*